(12) United States Patent
Hider et al.

(10) Patent No.: US 8,981,965 B2
(45) Date of Patent: Mar. 17, 2015

(54) VEHICLE LASER PARKING INDICATOR APPARATUS

(71) Applicant: Jatcom Corporation, San Martin, CA (US)

(72) Inventors: James M. Hider, San Martin, CA (US); Janice Marie Hider, San Martin, CA (US)

(73) Assignee: Jatcom Corporation, San Martin, CA (US)

( * ) Notice: Subject to any disclaimer, the term of this patent is extended or adjusted under 35 U.S.C. 154(b) by 0 days.

(21) Appl. No.: 14/070,565

(22) Filed: Nov. 3, 2013

(65) Prior Publication Data

US 2014/0055287 A1    Feb. 27, 2014

Related U.S. Application Data

(63) Continuation-in-part of application No. 13/207,401, filed on Aug. 10, 2011, now Pat. No. 8,610,598.

(51) Int. Cl.
*B60Q 1/48*    (2006.01)

(52) U.S. Cl.
CPC .................................. *B60Q 1/484* (2013.01)
USPC ................... 340/932.2; 116/28 R; 296/26.13; 296/1.04

(58) Field of Classification Search
USPC ....................................................... 340/932.2
See application file for complete search history.

(56) References Cited

U.S. PATENT DOCUMENTS

| | | | | |
|---|---|---|---|---|
| 2,753,439 | A * | 7/1956 | Greenfield | 362/543 |
| 4,042,816 | A * | 8/1977 | Smoot | 362/506 |
| 5,227,785 | A * | 7/1993 | Gann et al. | 340/932.2 |
| 6,733,134 | B2 * | 5/2004 | Bleiner | 340/904 |
| 7,287,793 | B2 * | 10/2007 | Hamilton | 296/1.04 |
| 7,375,621 | B1 * | 5/2008 | Hines | 340/435 |
| 2003/0089296 | A1 * | 5/2003 | Haynes | 116/28 R |

* cited by examiner

*Primary Examiner* — Eric M Blount
(74) *Attorney, Agent, or Firm* — Mark Gonzales

(57) ABSTRACT

In one embodiment, the present invention includes an apparatus to assist in parking a vehicle. The apparatus comprises a housing coupled to the vehicle and at least one laser coupled to the housing. The laser emanates light that impinges on a surface peripheral to the vehicle. The light indicates a target on the surface and a proximity to a boundary.

19 Claims, 15 Drawing Sheets

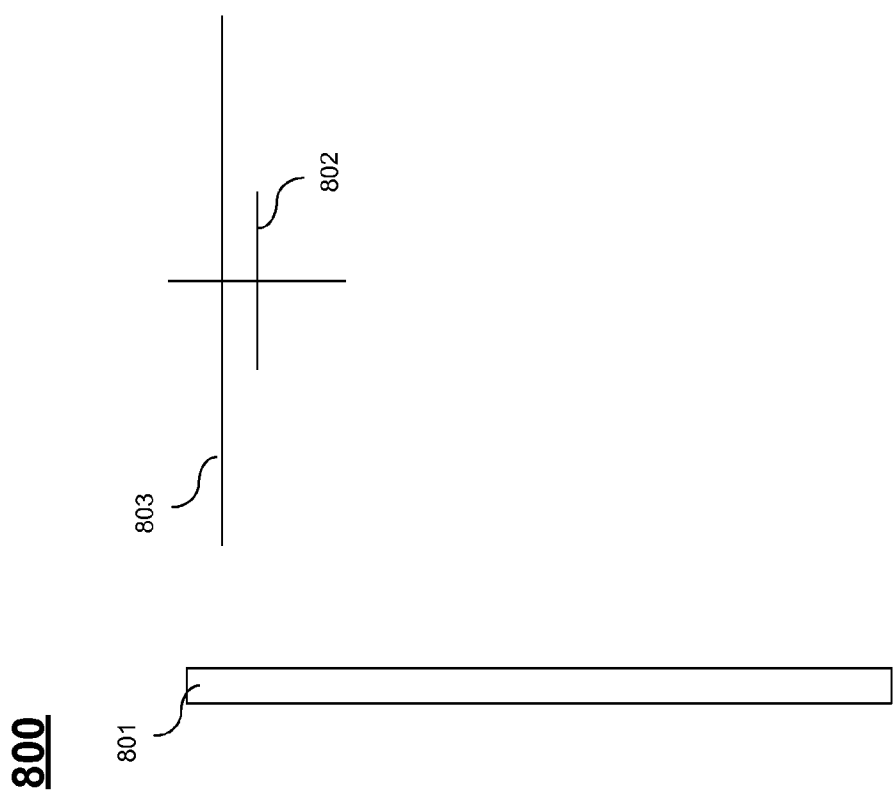

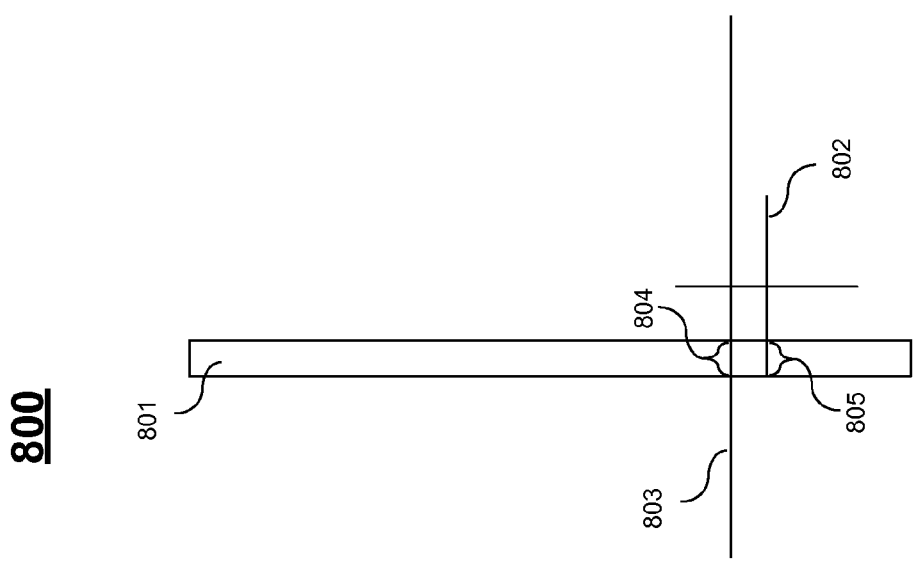

VEHICLE LASER PARKING INDICATOR APPARATUS

CROSS REFERENCE TO RELATED APPLICATIONS

This application is a continuation-in-part application of U.S. patent application Ser. No. 13/207,401 titled "Recreational Vehicle (RV) Slide-Out Parking Indicator Apparatus", filed Oct. 10, 2011.

BACKGROUND

The present invention relates to parking a vehicle having retractable extensions, and in particular, to vehicle laser parking indicator apparatus.

RVs may be difficult to park due to their size. RVs may be as long as 40 feet and may be equipped with only two rear view mirrors to judge distances along the sides of the vehicle when parking. Typical RV parks have parking spaces which accommodate an RV with slide-outs.

Slide-outs extend and increase the internal living space when the vehicle is parked. When parking such an RV, the slide-outs are not extended, and a driver must judge the distances to align the RV such that there is enough room to accommodate the slide-outs within the designated parking space. Parking to accommodate the slide-outs using only the site provided by the rear view mirrors to align the vehicle may be a daunting task.

Other types of vehicle may have extensions which may be retracted when moving and therefore, clearance may be difficult to estimate. For example, a back hoe may have retractable stabilizers. When situating the vehicle, the driver may not be able to see the areas in which the stabilizer footings may ultimately set. The back hoe may need to be parked close to a cement barrier making the estimation of clearance for the stabilizer footings critical. New methods and apparatus are necessary to aid in this difficult task.

SUMMARY

Embodiments of the present invention improve vehicle parking. In one embodiment of present invention includes an apparatus to assist in parking a vehicle. The apparatus comprises a housing coupled to the vehicle and at least one laser coupled to the housing. The laser emanates light that impinges on a surface peripheral to the vehicle. The light indicates a target on the surface and a proximity to a boundary.

In another embodiment the invention includes a system to assist in situating a vehicle. The system comprises and extension and a laser coupled to the vehicle. The extension is retracted into an un-deployed state, the laser produces a line of light reflected on the ground peripheral to the vehicle. The line is transformed by the boundary to indicate to a driver that a target area has passed the boundary. The target area corresponds to a clearance required for the deployment of the extension.

In yet another embodiment the invention includes a method to assist in situating a vehicle. The method comprises producing a line of light, moving a vehicle, a target area passing a boundary, and indicating the passing to a driver. The producing included producing a line of light reflected on the ground peripheral to the vehicle. The line corresponds to the target area. The moving includes moving the target area toward a boundary. The target area passes the boundary in response to the moving. The line is transformed by the boundary in response to the passing. The target area corresponds to a clearance required for the deployment of an extension of the vehicle. The moving occurs with the extension retracted into an un-deployed state.

BRIEF DESCRIPTION OF THE DRAWINGS

FIG. 8A-C illustrates a movement of a target on a surface and a proximity to a peripheral of a vehicle according to one embodiment of the present invention.

DETAILED DESCRIPTION

Described herein are techniques for apparatus to improve parking of vehicles. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
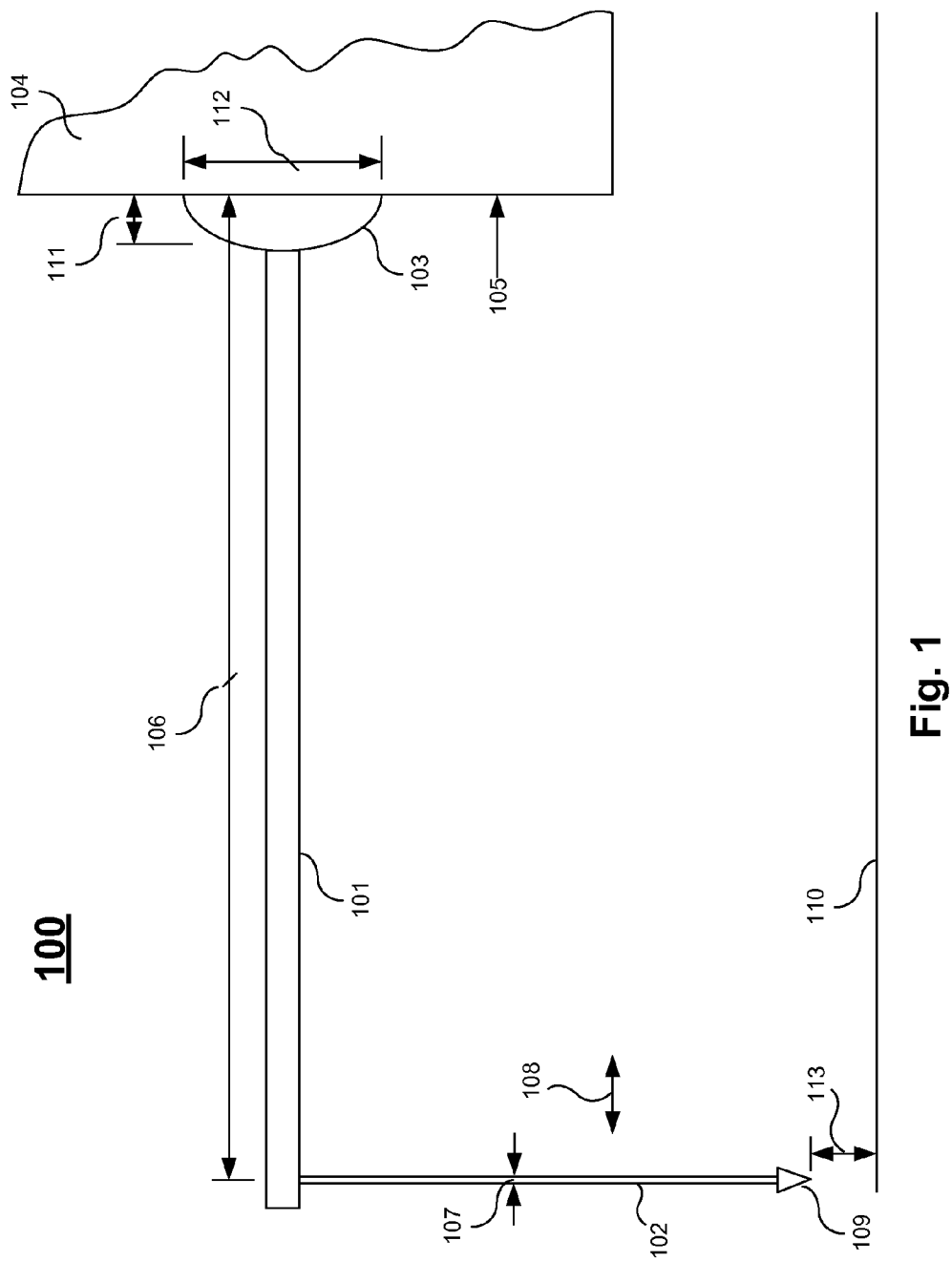
FIG. 1 illustrates a parking indicator apparatus according to one embodiment of the present invention.

FIG. 1 illustrates a parking indicator apparatus 100 according to one embodiment of the present invention. Parking indicator apparatus 100 includes a horizontal member 101, a vertical member 102, a mounting member 103, and an indicator 105. Horizontal member 101 is coupled to mounting member 103. Mounting member 103 is attached to side 105 of RV 104. Horizontal member 101 is coupled to vertical member 102, and indicator 109 is coupled to a lower portion of vertical member 102. Vertical member 101 extends vertical member 102 out from side 105 of RV 104, and thereby placing indicator 109 a distance 106 corresponding to clearance for an extended slide-out.

Mounting member 103 may be a suction cup having a width 112 and a depth 111 to provide sufficient mounting strength. Horizontal member 101 may be constructed of light weight tubing and may be inserted into a portion of a suction cup form of mounting member 103. Horizontal member 101 may remain secure and horizontal within mounting member 103 while no force is applied to vertical member 102 or horizontal member 101. The material of mounting member (e.g. a rubber like suction cup such as Levelle 312HN or 400MS) may allow movement when a force is applied, and return to the initial position when the force is removed. This may prevent damage and/or a detachment of parking indicator apparatus 100 when, for example, the end of the horizontal member 101 or a portion of vertical member 102 come into contact with a stationary object when parking RV 104.

Vertical member 102 may be constructed of the same light weight material as horizontal member 101. In one embodiment, vertical member 102 may be hinged such that vertical member 102 may be folded into or along horizontal member 106. In one case, horizontal member 101 may be constructed as a "U" shaped tube or other partially open shape which would give rigidity and also allow vertical member 102 to fold into horizontal member 101.

Alternatively, vertical member 102 may be a light weight metal tape formed into a shape to resist movement in horizontal directions 108. For example, vertical member 102 may be formed like a construction measuring tape which has a slight bow across its thickness 107 which would inhibit movement in horizontal directions 108 and facilitate maintaining a vertical orientation. If the vertical member 102 were to deflect due to the movement of the RV 104, the material and form of vertical member 102 may serve to return vertical member 102 to its original vertical orientation prior to the deflection.

Indicator 109 may be heavier than vertical member 102 and help to keep the vertical member 102 in a vertical orientation. Indicator 109 may be shaped as a point as shown or be round. Indicator 109 may also be colored florescent or another bright color to make it more noticeable from a distance. Vertical member 102 has a length which places indicator 109 a distance 113 from the ground 110. The distance may be a few inches such as 3-4 inches, for example. This allows indicator 109 to hover above ground 110 while RV 104 is moving.

Figure 2:
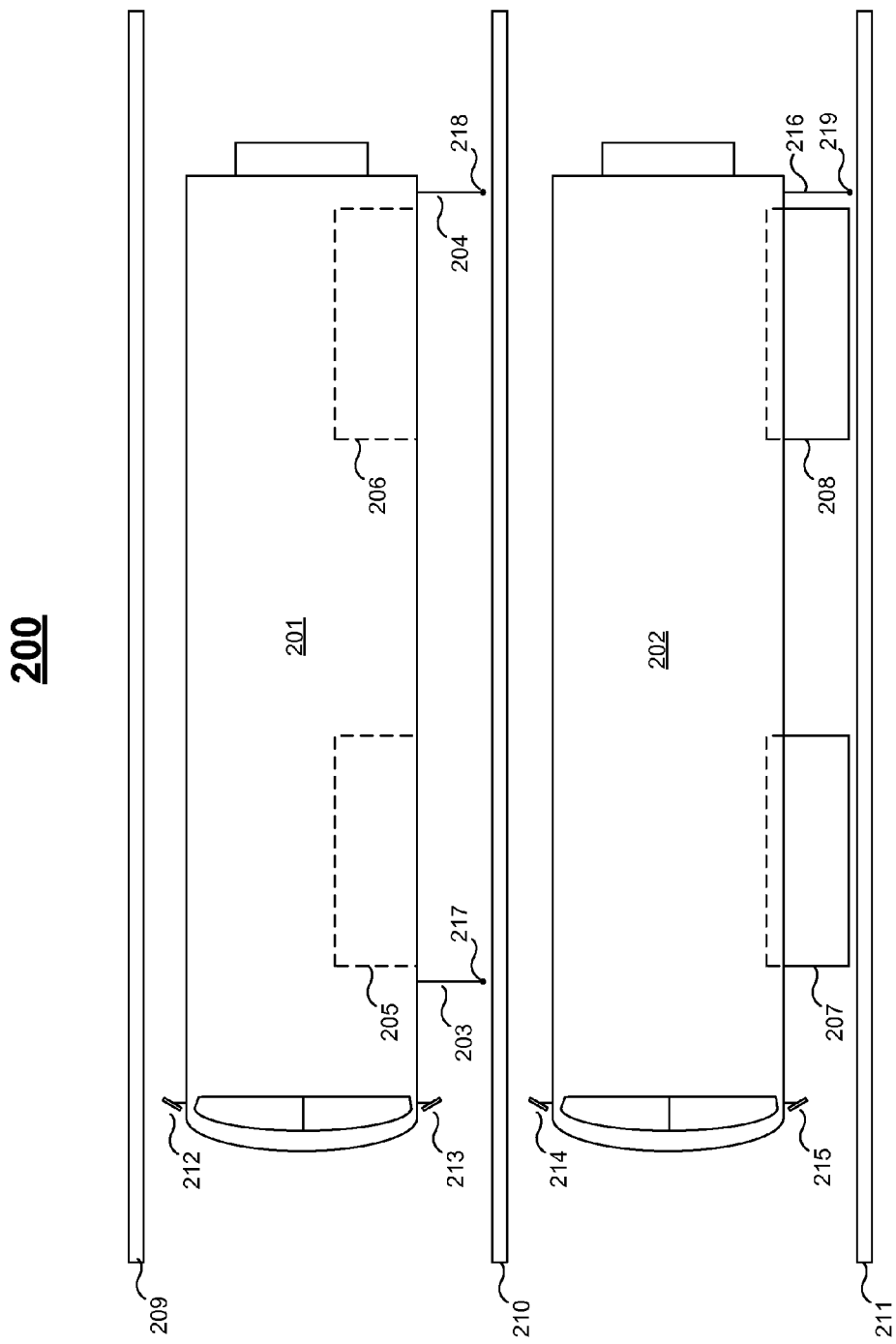
FIG. 2 illustrates an aerial view of a parking area with two parked RVs demonstrating the use of one embodiment of the present invention.

FIG. 2 illustrates an aerial view of a parking area 200 with two parked RVs (201, 202) demonstrating the use of one embodiment of the present invention. RV 201 has a location relative to parking line 209 and 210 just after a successfully parking. RV 201 includes slide-outs 205-206 in their non-extended positions, side rear view mirrors 212-213, and RV parking indicator apparatus 203-204. In this embodiment, parking indicator apparatus 203-204 includes indicators 217-218, and rear view mirrors 213 were used by the driver to align and park RV 201 within parking line 210.

Parking indicator apparatus 203-204 may be a temporarily mounted on the side of RV 201. Initially, RV 104 may approach the parking space separated by parking lines 209-210 and exit the vehicle to attach any number of parking indicator apparatus (e.g. apparatus 203-204). A user may attach slide-out indicator 203 in front of slide-out 205 and slide-out indicator 204 behind slide-out 206. Indicators 217-218 denote the actual extent of the slide-outs in the extended position, and therefore RV 201 is parked such that indicators 217-218 are slightly within parking line 210. In another embodiment, the indicators 217-218 may be designed such that they are slightly (4-5 inches) outside the slide-outs and the driver aligns the RV 201 with the indicators 217-218 directly above parking line 210. The number of RV parking indicator apparatus used depends on the size of the vehicle, the number of slide-outs or other extendable objects, and the user's preferences. For example, a driver may prefer to have an additional RV parking indicator apparatus between the RV parking indicator apparatus 203-204. A different driver may have a retractable awning on one side of the RV and a slide-out located on the opposite side. In this case, the user (i.e. the driver) may choose to put additional RV parking indicator apparatus on both sides of the vehicle to insure enough distance on each side of the RV to accommodate both the awning and the slide-out.

RV 202 is shown in a configuration after parking is completed and slide-outs 207-208 are in their extended positions. The slide-outs 207-208 may extend 2-3 feet out from the sides of RV 202. Parking indicator apparatus 216 includes indicators 219. Rear view mirrors 215 and RV parking indicator apparatus 216 were used by the driver to align and park RV 202 within parking line 211 (prior to extending slide-outs 207-208). Slide-outs 207-208 do not pass parking line 211 and extend a distance as indicated by parking indicator apparatus 216.

Figure 3:
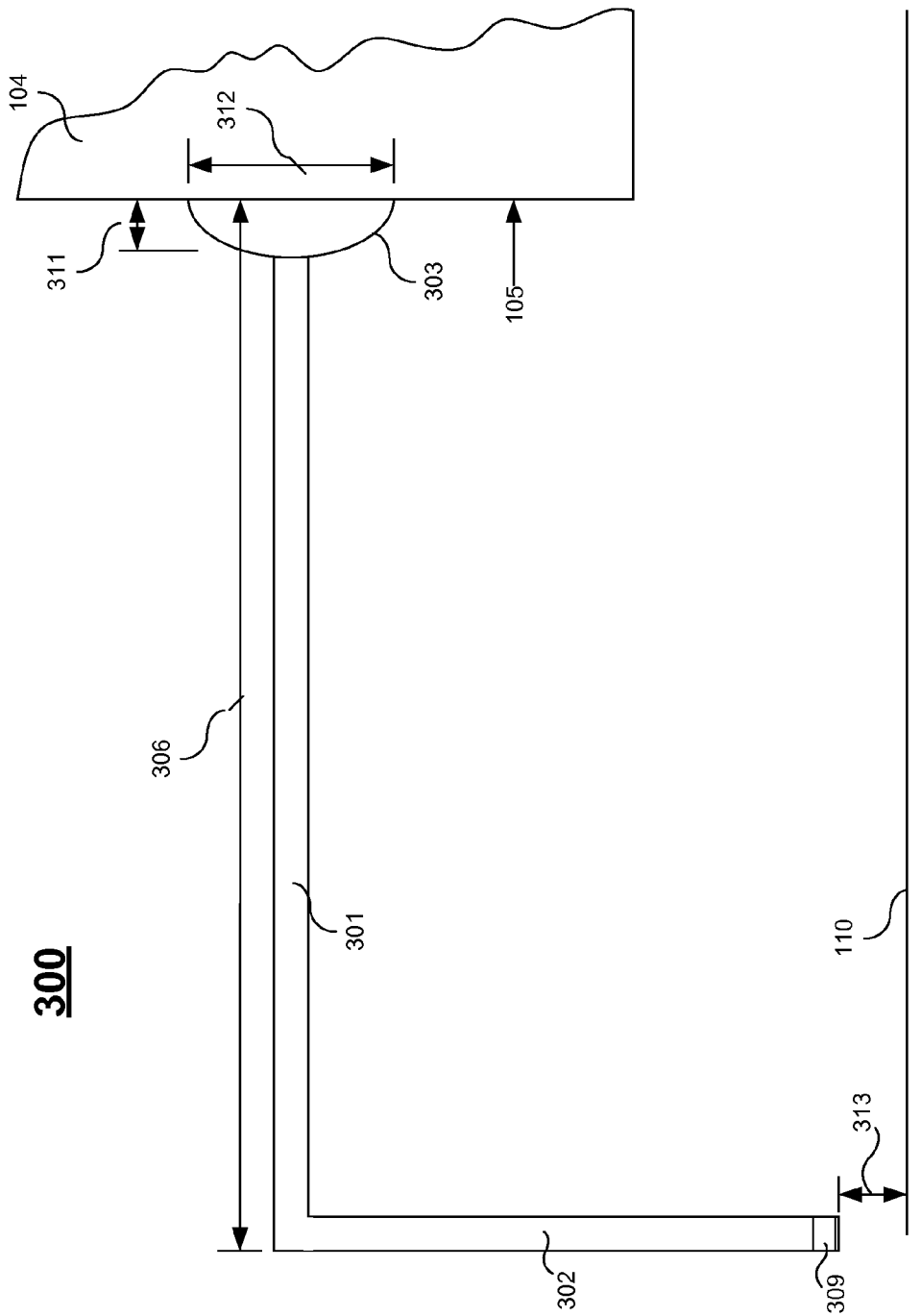
FIG. 3 illustrates a parking indicator apparatus according to another embodiment of the present invention.

FIG. 3 illustrates a parking indicator apparatus 300 according to another embodiment of the present invention. Parking indicator apparatus 300 includes a horizontal member 301, a vertical member 302, a mounting member 303, and an indicator 305. Horizontal member 301 is coupled to mounting member 303. Mounting member 303 is attached to side 105 of RV 104. Horizontal member 301 is coupled to vertical member 302, and indicator 309 is coupled to a lower portion of vertical member 302. Horizontal member 301 extends vertical member 302 out from side 105 of RV 104, and thereby placing indicator 309 a distance 306 corresponding to clearance for an extended slide-out. Vertical member 302 may be cut to provide a distance 313 from the bottom portion of the vertical member 302 and the ground 110.

In this embodiment horizontal member 301 and vertical member 302 are made from common material and have basically the same width. The tubing may be circular or square and horizontal member 301 and vertical member 302 may be joined (e.g. melded together) or may be formed from a single piece of material. Mounting member 305 may snap or clip onto a member (not shown) attached to side 105 of RV 104. This may allow for quick attachment and detachment from side 105.

Indicator 309 may be a reflector attached to the lower portion of vertical member 302. For example, indicator 309 may be reflective tape wrapped around the lower end of vertical member 302. In an alternative embodiment, indicator 309 may be a neon color such as neon yellow, for example.

In one embodiment, vertical member 302 and horizontal member 301 may be metal. In another embodiment, vertical member 302 and horizontal member 301 may be plastic. In yet another embodiment, horizontal member 301 may be constructed from two sections that are telescopic such that horizontal distance 306 may be adjusted.

Figure 4:
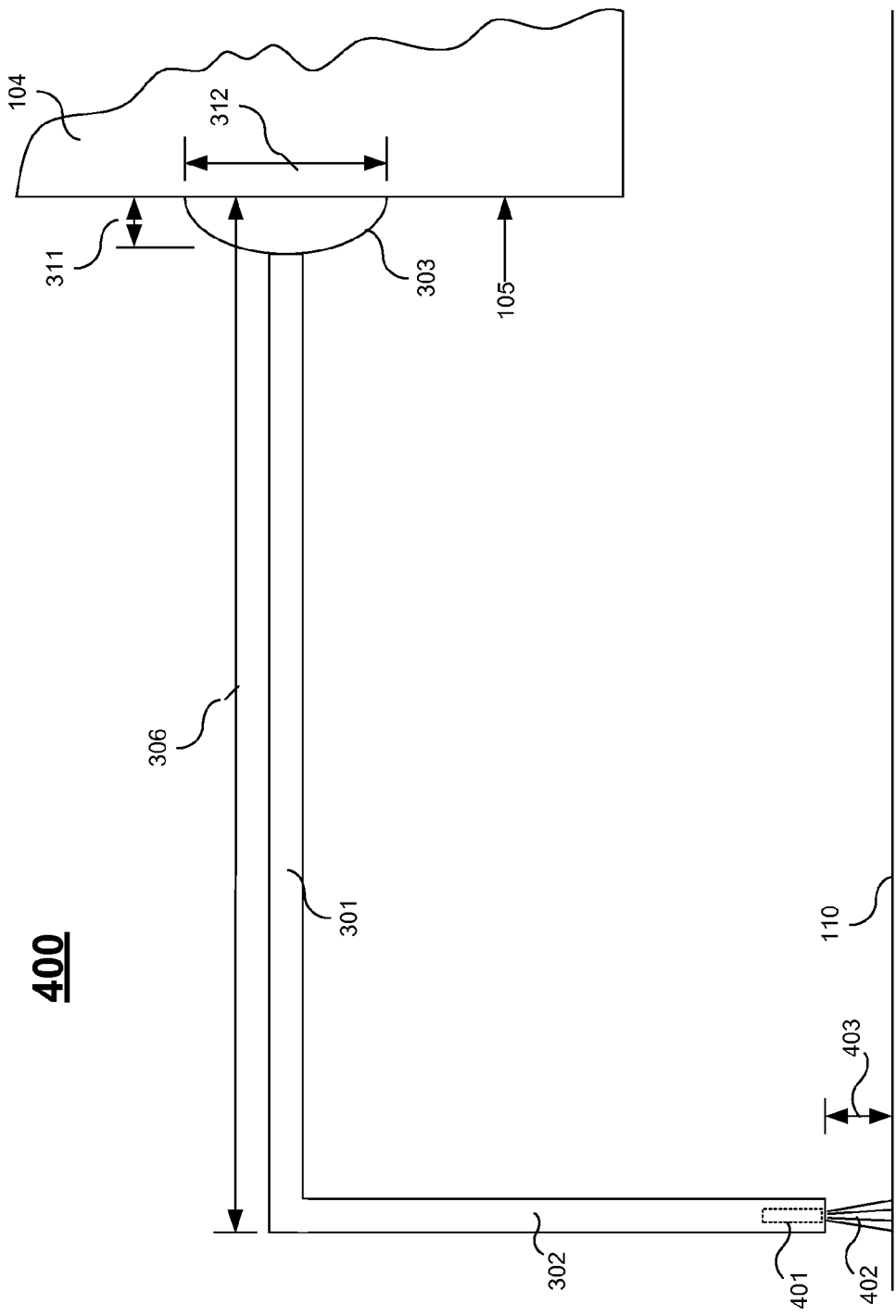
FIG. 4 illustrates a parking indicator apparatus according to yet another embodiment of the present invention.

FIG. 4 illustrates a parking indicator apparatus 400 according to yet another embodiment of the present invention. Parking indicator apparatus 400 includes horizontal member 301, vertical member 302, and mounting member 303 which have been described above in relation to FIG. 3. Parking indicator apparatus 400 further includes a light source 401 which provides light 402 over a distance 403. This may create a circle of light on ground 110 directly below vertical member 302. The light source may generate a colored light (e.g. green light) to further contrast with the black or dark colored ground 110. The light 402 may illuminate a bottom portion of vertical member 302 to indicate more clearly the location of the horizontal boundary presented by vertical member 302.

Figure 5:
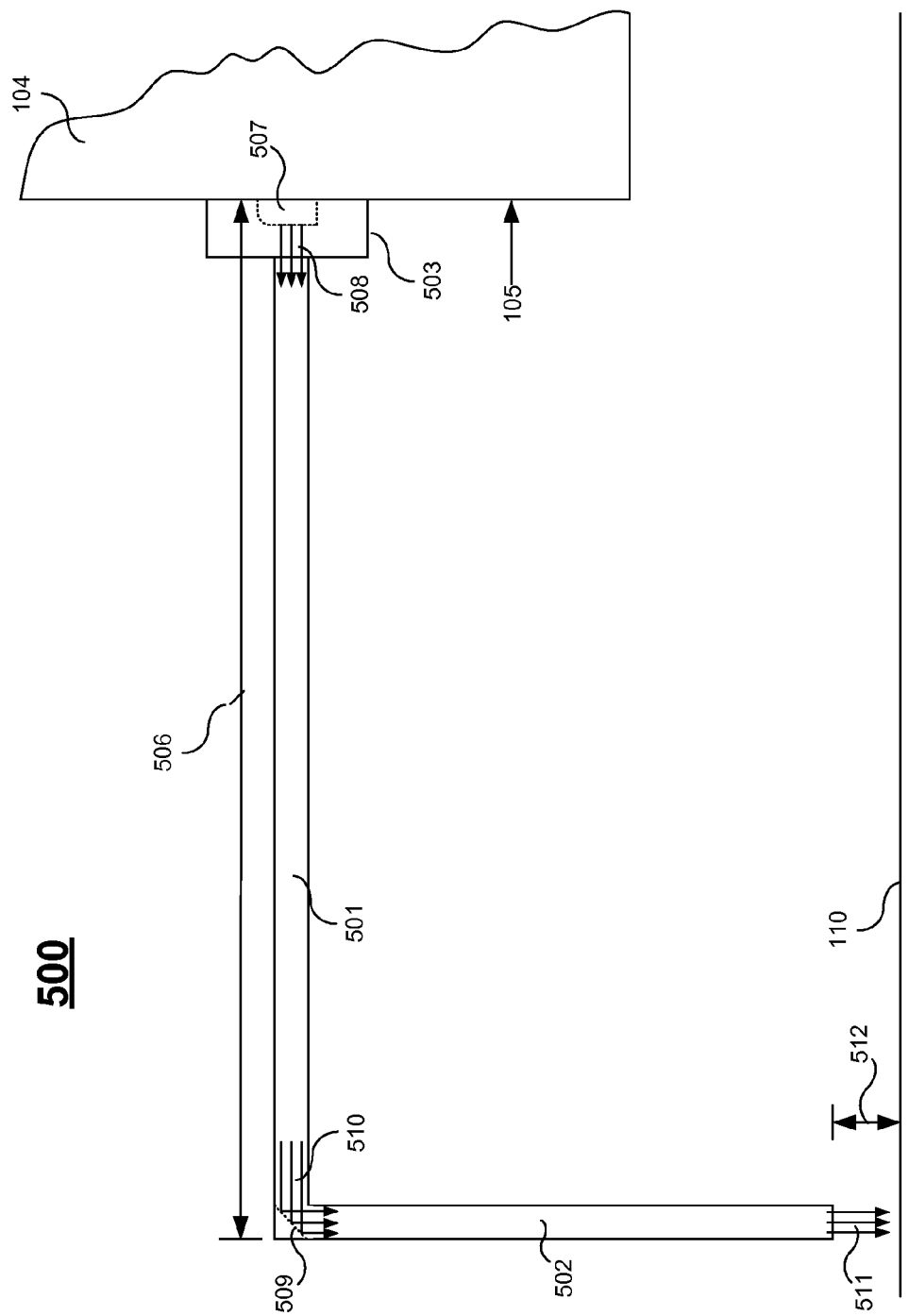
FIG. 5 illustrates a parking indicator apparatus according to one embodiment of the present invention.

FIG. 5 illustrates a parking indicator apparatus 500 according to one embodiment of the present invention. Parking indicator apparatus 500 includes horizontal member 501, vertical member 502, and mounting member 503 which are mechanically similar to horizontal member 301, vertical member 302, and mounting member 303 of FIG. 3. Mounting member 503 couples to side 105 and over RV side marker light 507 such that light rays (indicated by lines 508) travel through member 501 to reflective surface 509. Lines 510 indicate the light is reflected and travels through vertical member 502 and lines 511 indicate the light illuminates the ground 110 directly below vertical member 502. In one embodiment, at least a portion of the vertical member 502 is translucent and may be illuminated by the light rays. This may indicate more clearly the location of the horizontal boundary presented by vertical member 502.

Figure 6:
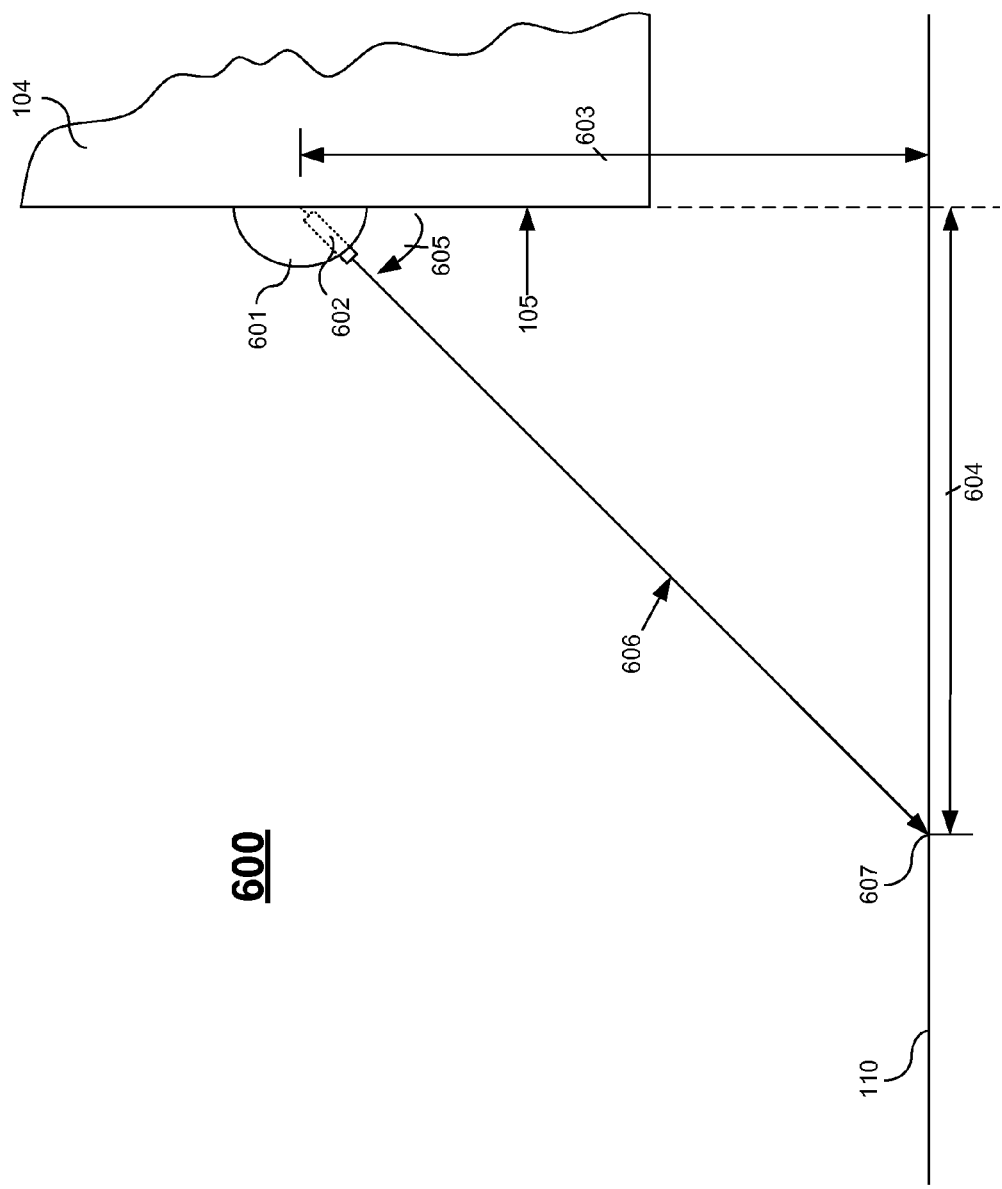
FIG. 6 illustrates a parking indicator apparatus according to another embodiment of the present invention.

FIG. 6 illustrates a parking indicator apparatus 600 according to another embodiment of the present invention. Parking indicator apparatus 600 includes mounted member 601 coupled to side 105 of RV 104 and a light source 602 arranged at angle 605 from side 105. Light source member 602 provides a light path 606 to point 607. If angle 605 is 45 degrees the height 603 will match length 604. In this case angle 605 and height 603 may set the distance 604 in which point 607 will be illuminated by light source member 602. The light source member 602 may be adjustable or may be set by an RV manufacturer to correspond to the distance presented by the RV's slide-outs. The light source may be a laser or other light source that provides a wider beam.

Figure 7:
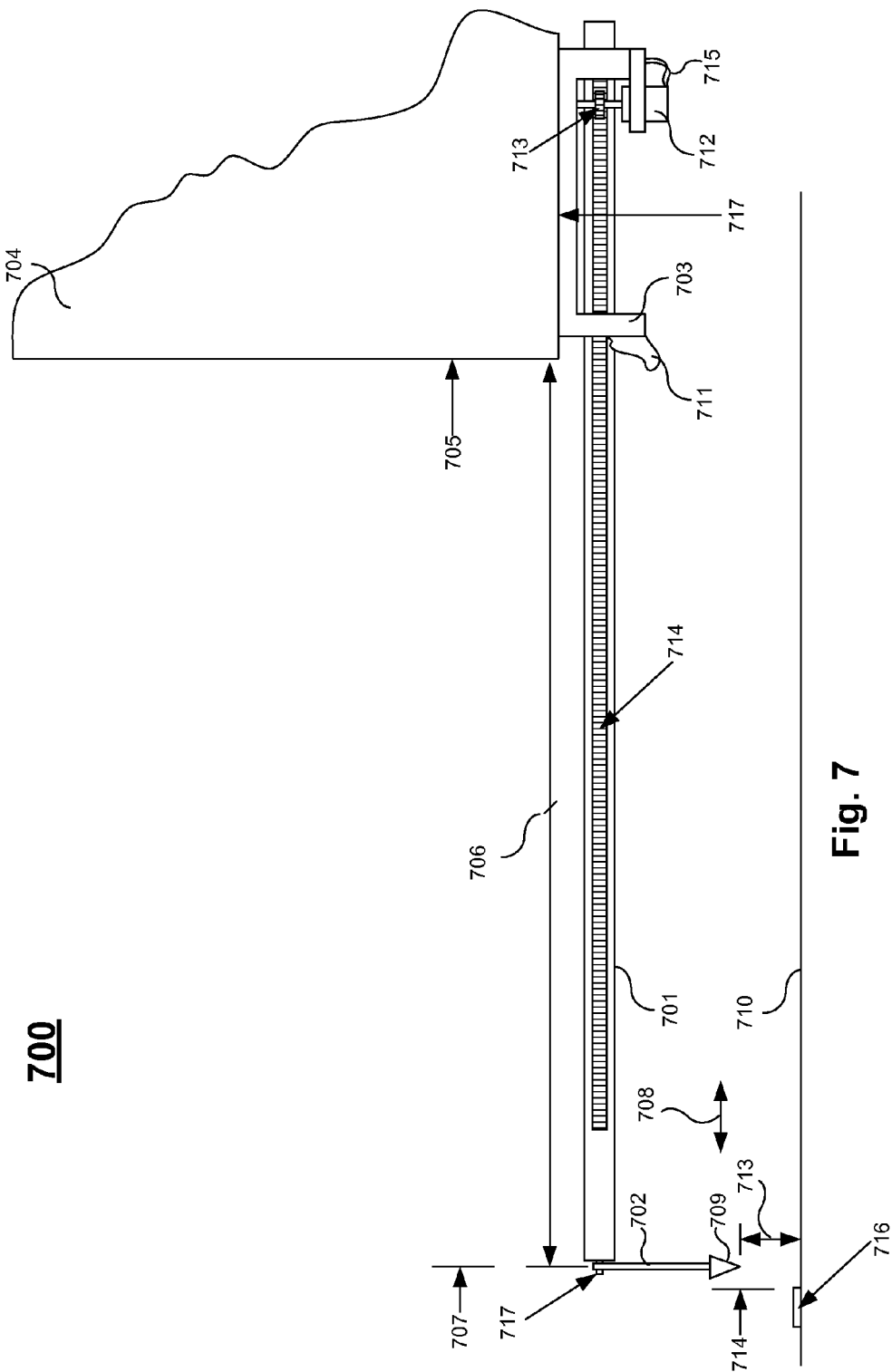
FIG. 7 illustrates a parking indicator apparatus according to yet another embodiment of the present invention.

FIG. 7 illustrates parking indicator apparatus 700 according to yet another embodiment of the present invention. Parking indicator apparatus 700 includes a horizontal member 701, a vertical member 702, a mounting member 703, and an indicator 709 which are similar to horizontal member 101, vertical member 102, mounting member 103, and indicator 109 of parking indicator apparatus 100 of FIG. 1. Mounting member 703 is attached to the bottom 717 of vehicle 704. Horizontal member 701 is coupled to mounting member 703 and is shown in a fully deployed position. Mounting member 703 extends horizontal member 701 a distance 706 from side 705 of vehicle 704.

An electric motor 712 is coupled to mounting member 703 to move horizontal member 701 in either direction 708. Electric motor 712 has a shaft coupled to gear 713 which has teeth to drive the indentations 714 on horizontal member 701. Mounting member 703 may include bearings or rollers to assist in providing smooth movement of horizontal member 701. Cables 715 may be coupled to an electronic board providing drive signals to operate electric motor 712. The electronic board may be controlled by a microcontroller which uses signals from limit switches to determine the fully deployed position and the fully stored position. Intermediate positions may be incrementally programmed if a stepper motor and control circuit are used in the design of the electronic board.

Hinging member 717 may couple vertical member 702 to horizontal member 701 such that vertical member 702 may swing back and forth while maintaining distance 706. Indicator 709 is coupled to vertical member 702 to set a distance 713 from the ground 710. Indicator 709 indicates horizontal periphery 707 of vehicle 704. Periphery 707 may be the side of a boat over hanging along the sides of a trailer, for example. Also as an example, periphery 707 may be the end of a slide-out of an RV in an extended position after parking. Indicator 709 may be used to compare periphery 707 to the periphery 714 of a parking space (indicated by line 716).

In one embodiment, parking indicator apparatus 700 may use slide 711 to place vertical member 702 into a stored position. For example, electric motor 712 retracts horizontal member 701 from the fully deployed position and as vertical member 702 comes into contact with slide 711, vertical member 702 swings up until its shaft falls into the notch at the top of slide 711. This may allow for automatic deployment and retraction of parking indicator apparatus 700.

In another embodiment, mounting member 703 may be coupled to vehicle 704 through a swivel. This may be used to prevent horizontal member 701 from being damaged if it comes into contact with a stationary object such as a fence post. The swivel mechanism may also be used to selectively deploy the horizontal member 701. In yet another embodiment, parking indicator apparatus 700 may engage gear 713 with a hand adjustment rather than motor 712 such that small adjustments of less than 20 inches may be made at the factory to accommodate RV alternatives for slide-out sizes. In this embodiment, a reduced length of indentations 714 may be required, and the swivel may be used to store the parking indicator apparatus 700 below vehicle 704 when not in use.

In yet another embodiment, mounting member 703 may be selectively coupled to vehicle 704 by mating of a magnet to a metal surface. In one instance mounting member 703 includes a magnet and vehicle 704 includes a metal surface to mate with mounting member 703. In another instance, vehicle 704 includes a magnet and vehicle 704 includes a metal surface to mate with this magnet. The location of the magnet or metal surface may depend on the configuration of the parking indicator apparatus. For example, in FIG. 3 the metal surface may be on side 305 of RV 304 and mounting member 303 may include a magnet to mate to this metal surface.

Figure 8B:
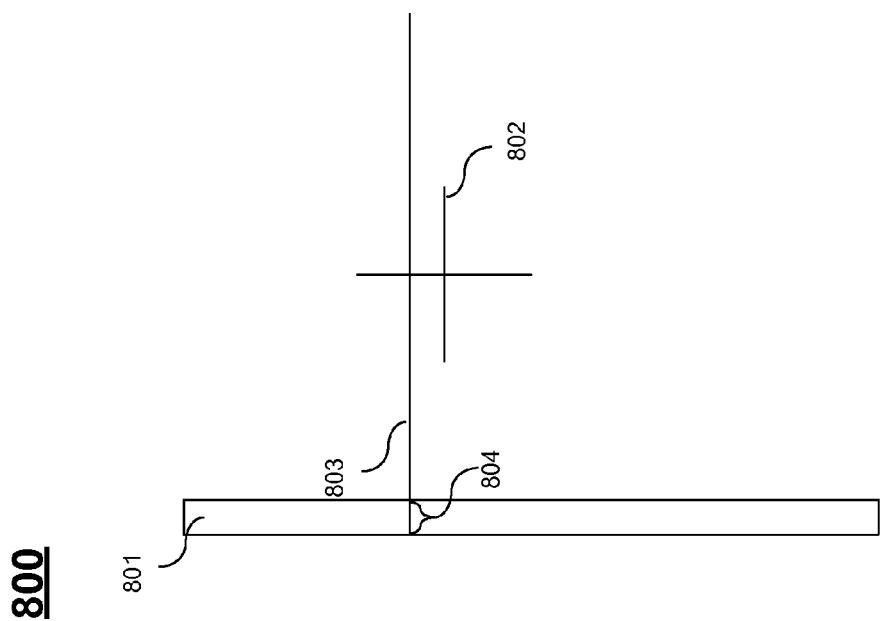

FIG. 8A-C illustrate a 2-dimensional view of a movement of target 802 on a surface and a proximity line 803 to indicate target 802 is proximate to a boundary 801 according to one embodiment of the present invention. A laser (e.g. laser 602 of FIG. 6) may be coupled to a vehicle as shown in FIG. 6 and emanating light that impinges on surface 800. A housing (e.g. housing 601 of FIG. 6) may be located a vertical distance above the surface 800 and the light may emanate at an angle (e.g. angle 605 of FIG. 6) toward surface 800 that defines a location of target 802. A plurality of lasers may be used to produce target 802 and proximity line 803. At least one laser may be a scanning laser.

FIG. 8A illustrates a possible initial condition of the light reflecting on surface 800 peripheral to said vehicle. Surface 800 may be any surface which a vehicle may navigate. For example, surface 800 may be the ground, a floor, or a cement walkway. In FIG. 8B, when target 802 becomes proximate to boundary 801, proximity line 803 crosses said boundary 801 and is transformed. Boundary 801 may be a white painted stripe indicating the boundary of the parking area. Boundary 801 may reflect a different intensity than surface 800 when the light of a laser impinges on it. Portion 804 of proximity line 803 may reflect more light due to the contrast of color between the boundary 801 and the surface 800. In this way, as proximity line 803 moves and portion 804 now shines on boundary 801, the proximity line 803 is transformed at portion 804.

In FIG. 8C, target 802 crosses boundary 801 and is transformed. At this time, portion 804 and 805 may be reflecting light at a higher intensity than other portions. The indication of two portions having increased intensity may be an indicator that target 802 has exceeded boundary 801.

Each of these transformations may be seen by a driver through a rear view mirror or may be seen on a monitor via a camera mounted or otherwise coupled to the vehicle. The camera may also be coupled to a computer and video processor. With the camera and the laser coupled to the vehicle maintaining a location and directional configuration in respect to one another, successive pictures may be compared in order to detect a transformation of proximity line 803. The video processing may include retrieving information from each frame corresponding to the proximity line 803 or any plurality of lines comprising target 802 and proximity line 803. A digital filtering technique may be used to remove all extraneous information such as surface details, for example.

An average contrast and intensity distribution may be used to establish a baseline of brightness. When a transformation of brightness is detected by this comparison and algorithm, an audio or video cue may be used to alert the driver. In one embodiment, a depiction of the proximity line may be displayed on a screen or onto the rear view mirrors in order for the driver to keep attention on both a gross approach to boundary 801 and the finer approach given as a line (or other appropriate visual cue) indicating the clearance left before target 802 crosses boundary 801.

Figure 9A:
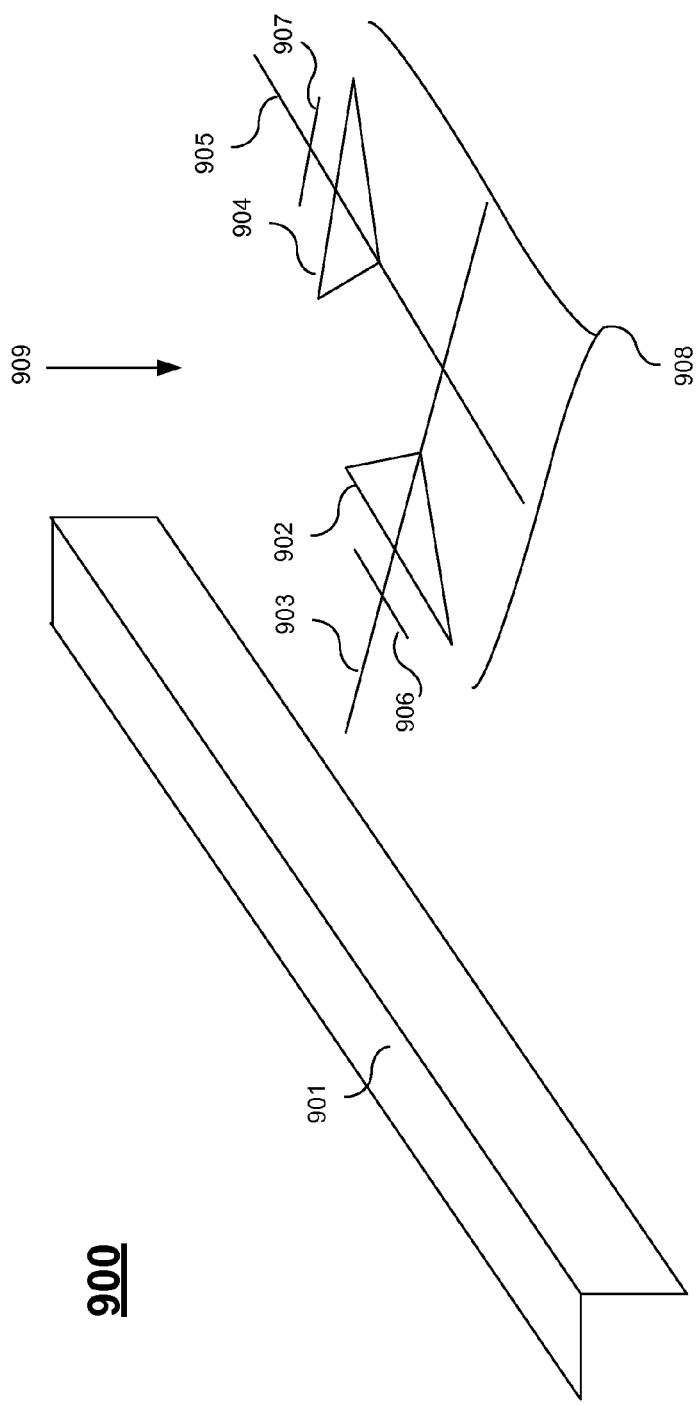
FIG. 9A-C illustrates a movement of a target on a surface and a proximity to a peripheral of a vehicle according to another embodiment of the present invention.
Figure 9B:
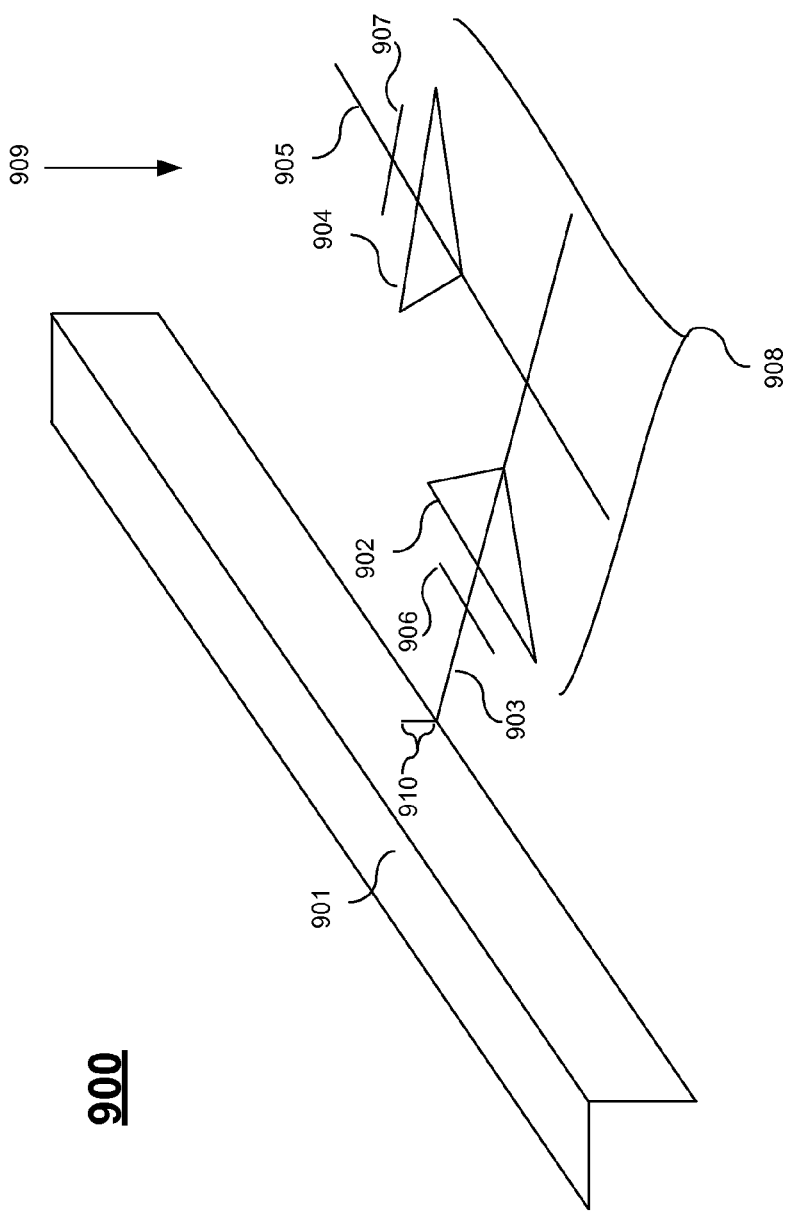
Figure 9C:
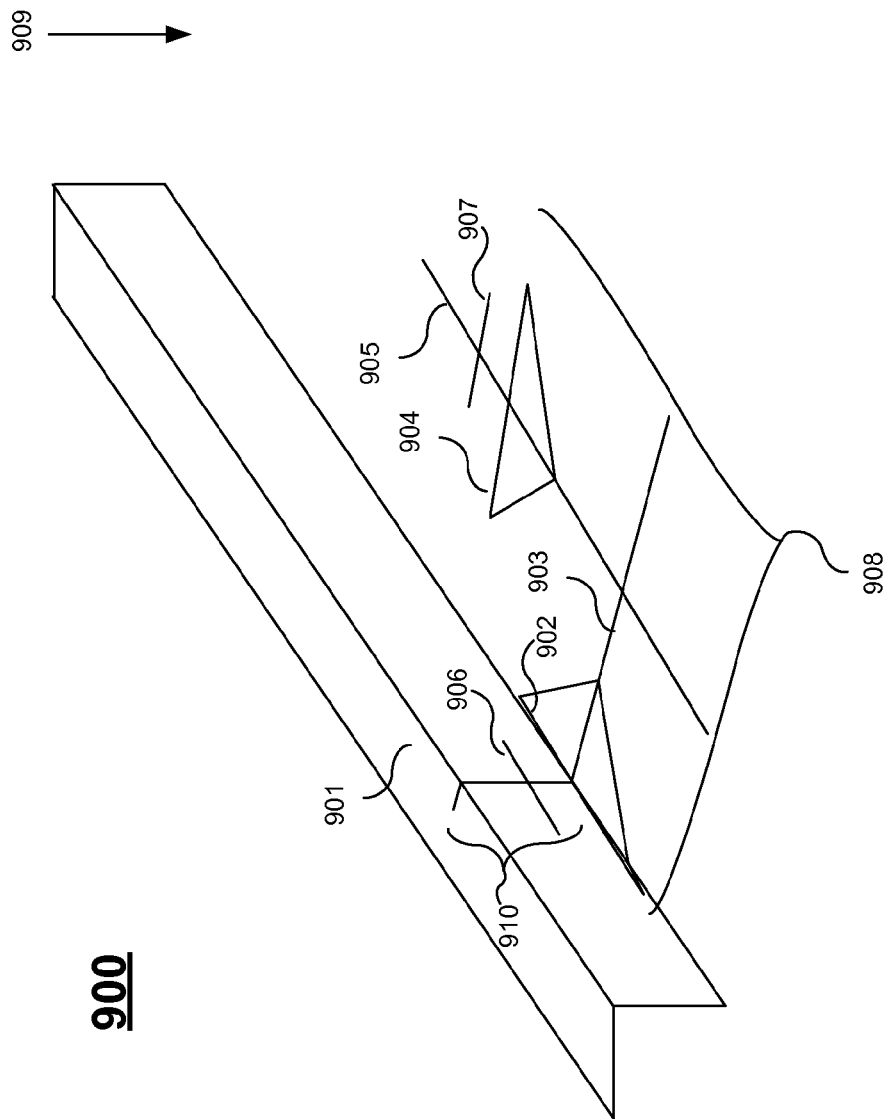

FIG. 9A-C illustrates a 3-dimensional view 900 of a movement of a target area 908 and a plurality of laser lines 902-907 reflecting on the ground 909 peripheral to a vehicle according to another embodiment of the present invention. FIG. 9A shows a possible initial condition of target area 908 and plurality of laser lines 902-907 approaching boundary 901. Target area 908 encompasses shapes 902 and 904 and portions of lines 903 and 905. FIG. 9B shows line 903 transformed at portion 908. Portion 908 meets the remainder of line 903 at a discontinuity caused by the laser light shining on boundary 901. Boundary 901 may be a curb and the discontinuity of line 903 may indicate that target area 908 is proximate to the curb.

A camera system described above in regard to FIG. 8A-C may be implemented in yet another embodiment in regard to this transformation of line 903. The camera may process successive images and filter each image to reveal the plurality of lines 902-907. An algorithm may process each image and detect a discontinuity between images. This may be accomplished by taking a difference or differential to determine where the greatest changes exist between images. In another embodiment, a reference image may be used prior to a discontinuity being detected, and in this way, the extent of transformation may be monitored. A visual or audio cue may be responsive to detecting this discontinuity.

FIG. 9C shows shape 902 coming into contact with boundary 901. Line 903 and a portion of lines comprising shape 902 have been transformed. In one embodiment, line 906 may be used to gage the target area 908 proximity within inches (i.e. less than 12 inches) of crossing boundary 901. A visual or audio cue may be used in response to the distortion of shape 902.

Figure 10A:
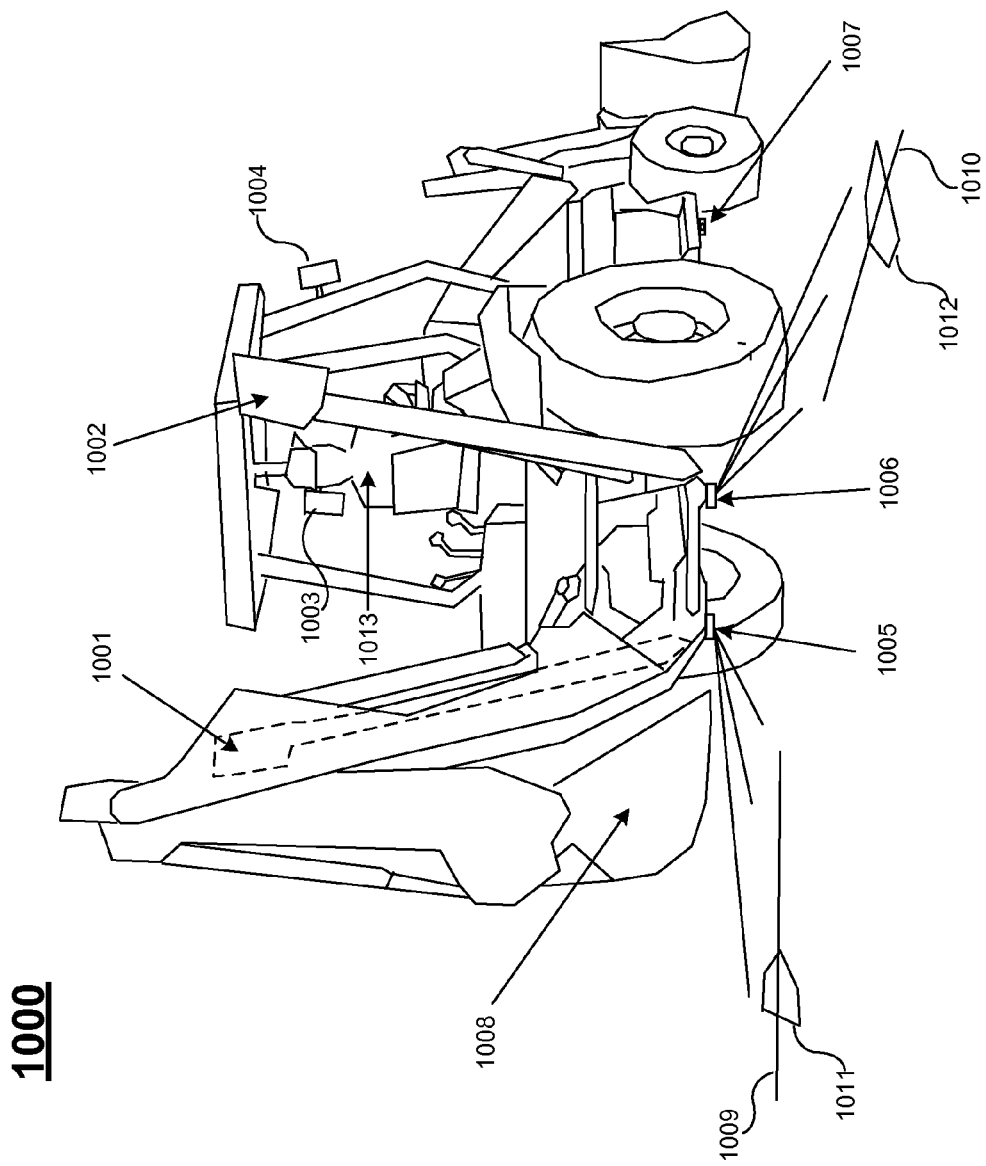
FIG. 10A-B illustrates a situating of a back hoe according to an embodiment of the present invention.
Figure 10B:
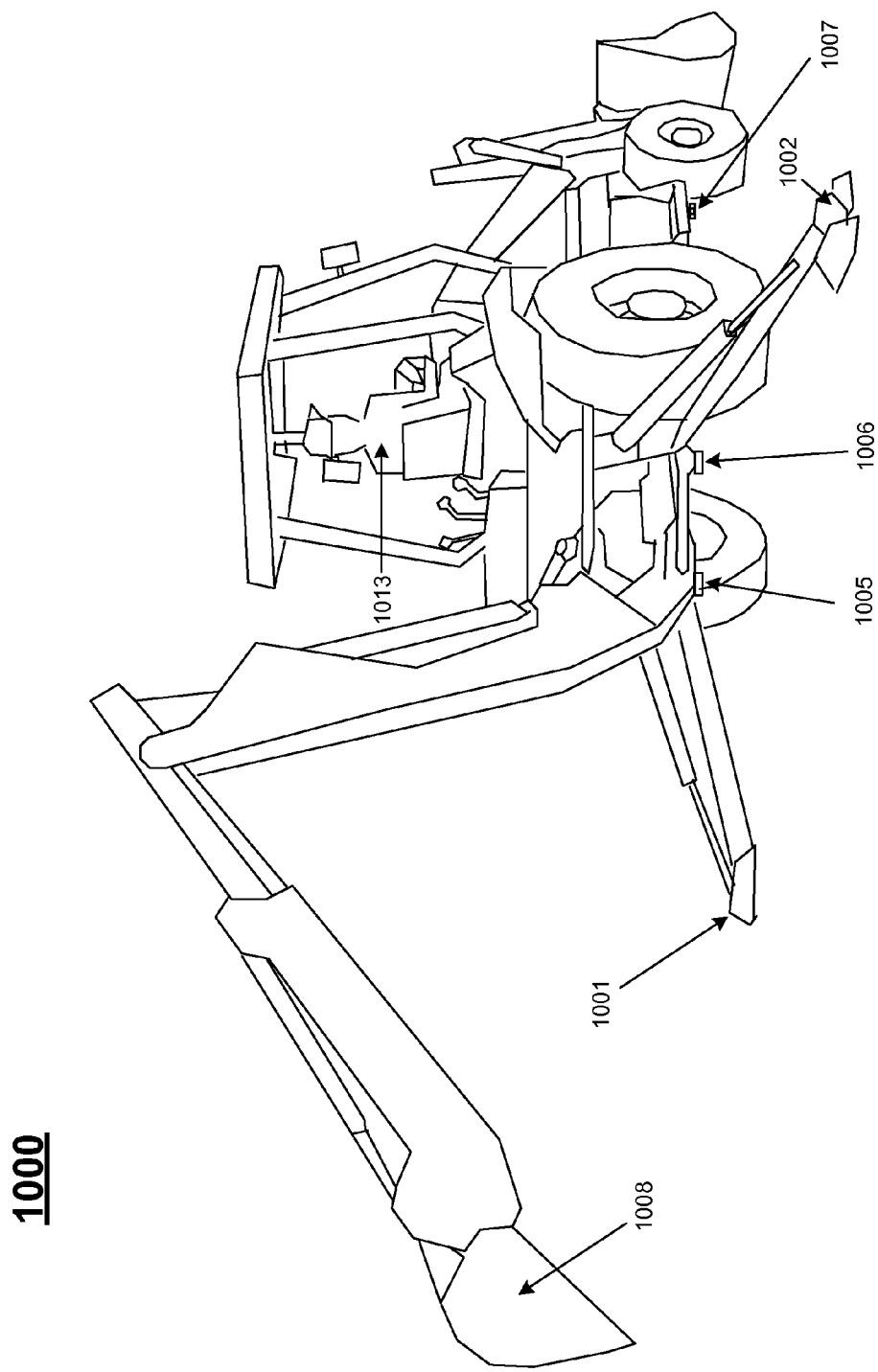

FIG. 10A-B illustrates a system to assist in situating a back hoe 1000 according to an embodiment of the present invention. FIG. 10A shows back hoe 1000 in a possible initial condition in which driver 1013 drives back hoe 1000 with stabilizer footings 1001-1002 (a type of extension) retracted in an un-deployed state. Bucket 1008 is in a retracted position. Modules 1005-1006 include lasers which produce targets 1011-1012 and proximity lines 1009-1010 respectively (as shown). Camera module 1007 may be attached to back hoe 1000 to record images related to target 1012 and proximity line 1010. A complimentary camera module (not shown) may be attached to the other side of back hoe 1000 in order to record images related to target 1011 and proximity line 1009. A plurality of lines may form target 1012 in the shape of a stabilizer footing 1002.

Mirrors 1003-1004 may be used by the driver to monitor the approach of the targets 1011-112 and proximity lines 1009-1010 toward a boundary. Mirrors 1003-1004 may be manufactured with a liquid crystal display (LCD) translucent monitors such that a visual cue may be interposed between the reflected line of site from the driver 1013 and the target 1011-1012 respectively. The LCD translucent monitors may receive information from their corresponding camera modules (i.e. mirror 1004 with LCD monitor receiving information from camera module 1007). This visual cue shown on mirror 1004 may be a depiction of the lines associated with target 1012 and proximity line 1010, for example.

Modules 1005-1006 may include a circuit to pulsate the lasers. The pulsating may include an off time greater than or equal to 16 milliseconds. The pulsating may include alternating between indication of the target (e.g. target 1011) and the proximity (e.g. proximity line 1009). The pulsating may include alternating between two levels of intensity. The pulsating may be synchronous (or otherwise timed) with the camera (e.g. camera module 1007) such that separate pulsed lines may be captured as separate images and therefore, be readily processed independently.

FIG. 10B shows back hoe 1000 in the deployed configuration. Stabilizer footings 1001-1002 are placed where targets 1011-1012 were indicated in FIG. 10A. Camera modules (e.g. 1007) and modules 1005-1006 may be turned off or otherwise disabled in this configuration. Bucket 1008 may now be deployed as shown with stabilizer footings 1001-1002 correctly in place where targeted by driver 1013.

The above description illustrates various embodiments of the present invention along with examples of how aspects of the present invention may be implemented. The above examples and embodiments should not be deemed to be the only embodiments, and are presented to illustrate the flexibility and advantages of the present invention. For example, although these embodiments may be used ideally for RVs or back hoe vehicles, they may be used also with trailers (e.g. fifth wheels), trucks with bed campers that have extensions such as slide-outs, "pop-outs" or footings, or any other vehicle requiring targeted alignment and spacing. Based on the above disclosure, other arrangements, embodiments, implementations and equivalents will be evident to those skilled in the art and may be employed without departing from the spirit and scope of the invention.

What is claimed is:

1. An apparatus to assist in parking a vehicle, said apparatus comprising:
    an extension coupled to said vehicle;
    a housing coupled to said vehicle and
    at least one laser coupled to said housing and emanating light that impinges on a surface peripheral to said vehicle, wherein said light indicates a target on said surface and a proximity to a boundary, and
    wherein said target includes a line which is transformed by said boundary to indicate to a driver that a target area has passed said boundary, and wherein said target area corresponds to a clearance required for the deployment of said extension.

2. The apparatus of claim 1 wherein said housing is located a vertical distance above said surface and wherein said light emanates at an angle toward said surface that defines a location of said target.

3. An apparatus to assist in parking a vehicle, said apparatus comprising:
    an extension coupled to said vehicle;
    a housing coupled to said vehicle;
    at least one laser coupled to said housing and emanating light that impinges on a surface peripheral to said vehicle, wherein said light indicates a target on said surface and a proximity to a boundary; and
    a circuit pulsating said at least one laser; and
    wherein said target includes a line which is transformed by said boundary to indicate to a driver that a target area has passed said boundary, and wherein said target area corresponds to a clearance required for the deployment of said extension.

4. The apparatus of claim 3 wherein said pulsating includes an off time greater than or equal to 16 milliseconds.

5. The apparatus of claim 3 wherein said pulsating includes alternating between indication of said proximity and said boundary.

6. The apparatus of claim 3 wherein said pulsating includes alternating between two levels of intensity.

7. A system to assist in situating a vehicle, said system comprising:
- an extension coupled to said vehicle, said extension retracted into an un-deployed state; and
- an indicator apparatus including a housing coupled to said vehicle and
  - at least one laser coupled to said housing and emanating light that impinges on a surface peripheral to said vehicle, wherein said light indicates a target on said surface and a proximity to a boundary, wherein said at least one laser is a scanning laser,
- wherein said target includes a line which is transformed by said boundary to indicate to a driver that a target area has passed said boundary, and wherein said target area corresponds to a clearance required for the deployment of said extension.

8. The system of claim 7 wherein the line is included in a plurality of lines forming a target in the shape of a stabilizer footing.

9. The system of claim 7 further comprising a second line reflected on the ground peripheral to said vehicle, wherein said second line is transformed by said boundary to indicate to a driver that said target area is proximate to said boundary.

10. The system of claim 7 further comprising a camera arranged to capture the transformation of said line.

11. The system of claim 10 further comprising a computer coupled to said camera to translate information regarding the transformation.

12. The system of claim 11 further comprising:
a digital to analog converter coupled to said computer;
an amplifier coupled to said digital to analog converter; and
a speaker coupled to said amplifier, said speaker producing an audio cue in response to said transformation.

13. The system of claim 11 further comprising:
a digital to analog converter coupled to said computer;
an amplifier coupled to said digital to analog converter; and
a display coupled to said amplifier, said display producing a visual indication of the transformation.

14. The system of claim 7 wherein the transformation is a change in the intensity of said light reflected crossing over said boundary.

15. The system of claim 7 wherein the transformation is a change in the shape of the line crossing over said boundary.

16. A method to assist in situating a vehicle, said method comprising:
producing a line of light reflected on the ground peripheral to said vehicle, wherein said line corresponds to a target area;
moving said vehicle and thereby moving said target area toward a boundary;
said target area passing said boundary in response to said moving; and
indicating said passing to a driver,
wherein said line is transformed by said boundary in response to said passing, wherein said target area corresponds to a clearance required for the deployment of an extension of said vehicle, and wherein said moving occurs with said extension retracted into an un-deployed state.

17. The method of claim 16 further comprising:
producing a second line of light reflected on the ground peripheral to said vehicle;
said target area moving proximate to said boundary in response to said moving; and
indicating to a driver that said target area is proximate to said boundary,
wherein said second line is transformed by said boundary in response to said target area moving proximate to said boundary.

18. The apparatus of claim 16 further comprising capturing said transformation on camera by comparing a first image to a second image.

19. The apparatus of claim 18 where said line and said second line are pulsated synchronous with said camera such that said line and said second line may be captured as separate.

* * * * *